3,642,986
ASPIRIN-CHARCOAL COMPOSITIONS
William Arthur Welch, 401 Eden Road, Apt. I-5, Lancaster, Pa. 17601, and Fritz Peter Kohler, 314 Avon Road, Bryn Mawr, Pa. 19019
No Drawing. Filed Apr. 1, 1970, Ser. No. 24,833
Int. Cl. A01n 9/00, 9/24; A61k 27/00
U.S. Cl. 424—125                                      5 Claims

ABSTRACT OF THE DISCLOSURE

Aspirin, which is unstable and decomposes in the presence of activated charcoal, is stabilized by converting the aspirin to its aluminum salt. Therapeutically useful and stable compositions comprising aspirin and activated charcoal are provided.

---

This invention relates to therapeutic compositions. It particularly relates to therapeutic compositions comprising aspirin and activated charcoal.

The beneficial and antipyretic effects of acetyl salicylic acid (aspirin) are well recognized (Goodman and Gilman, The Pharmacological Basis of Therapeutics, pages 312 ff., third edition, 1965, Macmillan, N.Y.). Activated charcoal, or activated carbon, is an excellent adsorbent and use of this property has been made in the treatment of such gastrointestinal disorders as dyspepsia, flatulence, diarrhea, and dysentery (Goodman and Gillman, ibid., p. 979).

Hereinafter, the terms activated charcoal and activated carbon will be used synonymously.

In certain gastrointestinal disorder associated with pain, such as, for example, upset stomach and headache resulting from excessive intake of alcoholic beverages, it is desirable to administer orally both aspirin and charcoal. However, aspirin rapidly hydrolyzes in an aqueous medium in the presence of activated charcoal to produce the undesirable acetic acid and the considerably less active salicylic acid. Apparently, the activated charcoal tends to act as a catalyst in this hydrolysis.

It is, accordingly, an object of this invention to provide compositions comprising aspirin and activated charcoal in which compositions the aspirin remains stable and does not hydrolyze or otherwise decompose on exposure to moisture or on contact with aqueous media.

It is a further object of this invention to provide compositions comprising aspirin and activated charcoal which compositions have a buffering effect on the acidity of the aspirin.

It is another object of this invention to provide therapeutically effective compositions containing aspirin and activated charcoal for use in gastrointestinal upsets.

These and other objects are acccomplished in accordance with the present invention, the description of which follows.

In accordance with the invention it has been found that the aluminum salt of aspirin, hereinafter referred to as aluminum aspirin, of the formula

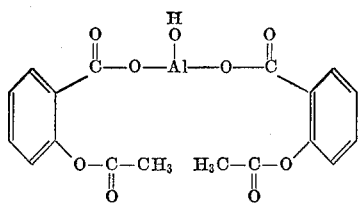

which compound possesses the analgesic and antipyretic properties of aspirin, when intimately mixed with activated charcoal remains stable for an indefinite period of time and retains its analgesic and antipyretic activities. Mixtures of these two ingredients after storage under exposure to moisture for a period in excess of two years still retain completely the desired activities of both aspirin and activated charcoal. This stability of aluminum aspirin to hydrolysis in the presence of activated charcoal is totally unexpected. Because of this stability it is possible to formulate compositions comprising aspirin (as aluminum aspirin) and activated charcoal in tablets and soft gelatin capsules, which formulations retain their activity after standing for two years.

Activated charcoal is obtained from the residue formed from the destructive distillation or heating of such organic matter as wood, nut shells, bone paper mill residues, etc. The charcoal residue is then specially treated to purify and activate it. While any such activated charcoal is suitable for use in the compositions of this invention, Medicinal Norit, a medicinal activated charcoal meeting the specifications in the U.S. Pharmacopeia XVII supplied by the General Norit Co., Ltd., of Amsterdam, Holland, is preferred.

Aluminum aspirin of the grade described in the National Formulary XIII, manufactured by Anderson Chemical Company, Weston, Mich., was used. Instead of aluminum aspirin, adducts of aluminum aspirin with aliphatic esters, such as, for example, the ethyl acetate adduct described in U.S. Patent No. 3,041,240 and the ethyl acetoacetate adduct described in U.S. Patent No. 3,082,152 may be used. These adducts which usually contain 1 mol of ester to 2 mols of aluminum aspirin have the same analgesic and antipyretic properties of aluminum aspirin. In addition, they are more easily formulated into tablets.

In formulating the compositions of the present invention, the ratio by weight of the aluminum aspirin to the activated charcoal may be varied from about 9:1 to 1:9 to suit the purposes of the specific preparations. While a 1:1 ratio by weight of each of the active ingredients is most frequently used, in those cases where it is desired to have larger amounts of charcoal present, such as in the treatment of the after-effect of excessive alcohol intake, the ratio of activated charcoal to aluminum aspirin is preferably about 9:2.

The invention will be more fully understood from the examples which follow, which examples are given only by way of illustration and are not to be considered as limiting.

EXAMPLE 1

20,000 scored tablets for oral use, each tablet containing 325 mg. (approximately 5 grains) each of aluminum aspirin and activated charcoal were prepared from the following ingredients:

|  | Grams |
|---|---|
| Aluminum aspirin | 6,500 |
| Activated charcoal | 6,500 |
| Starch, U.S.P. | 500 |
| Gelatin, U.S.P. | 22 |
| Talc, U.S.P. | 330 |
| Calcium stearate | 60 |

The aluminum aspirin and activated charcoal were thoroughly mixed, and to the mixture the starch (in a 10% aqueous paste) and the gelatin (in a 10% aqueous solution) were added while stirring. The stirring was continued until a uniform damp mass was obtained. This damp mass was then dried, and the dried material passed through an oscillating granulator to be converted into a coarse granulation. Talc and calcium sterate were added, and after being thoroughly mixed, the material was compressed into scored tablets.

For the relief of stomach distress, mild headache or arthritic pain, the initial dose was 3 tablets; 1 tablet is then taken every 2 hours, as necessary.

EXAMPLE 2

20,000 coated tablets for oral use, each tablet containing 195 mg. (approximately 3 grains) each of aluminum aspirin and activated charcoal were prepared from the following ingredients:

| | Grams |
|---|---|
| Aluminum aspirin | 3,900 |
| Activated charcoal | 3,900 |
| Starch, U.S.P. | 300 |
| Gelatin, U.S.P. | 14 |
| Talc, U.S.P. | 200 |
| Calcium stearate | 36 |

The procedure described in Example 1 was followed with the exception that the mixture was compressed to provide tablets which would not disintegrate on tumbling. The tablets were then coated with a sugar syrup.

EXAMPLE 3

10,000 scored tablets for oral use, each tablet containing 65 mg. (approximately 1 grain) aluminum aspirin and 300 mg. activated charcoal, were prepared according to the procedure described in Example 1 from the following ingredients:

| | Grams |
|---|---|
| Aluminum aspirin | 650 |
| Activated charcoal | 3,000 |
| Starch, U.S.P. | 350 |
| Gelatin, U.S.P. | 12 |
| Talc, U.S.P. | 200 |
| Calcium stearate | 30 |

In the prevention of a "hangover" which may result from an excessive intake of alcohol, 8 tablets are taken before retiring. In lieu of this and for the alleviation of initial discomfort, an initial dose of 6 tablets followed by successive doses of 4 tablets every 2 hours may be taken.

EXAMPLE 4

10,000 hard gelatin capsules for oral use, each tablet containing 65 mg. (approximately 1 grain) each of aluminum aspirin and activated charcoal were prepared from the following ingredients:

| | Grams |
|---|---|
| Aluminum aspirin | 650 |
| Activated charcoal | 650 |
| Lactose, U.S.P. | 1,000 |
| Starch, U.S.P. | 500 |
| Talc, U.S.P. | 400 |

A uniform mixture of the ingredients is prepared and filled into two-piece hard gelatin capsules.

EXAMPLE 5

10,000 soft gelatin capsules for oral use, each tablet containing 65 mg. (approximately 1 grain of aluminum aspirin) and 130 mg. (approximately 2 grains) of activated charcoal, were prepared by dispersing 650 grams aluminum aspirin and 1,300 grams activated charcoal in sufficient corn oil to render the composiiton capsulatable.

EXAMPLE 6

10,000 scored tablets for oral use, each tablet containing 325 mg. (approximately 5 grains) aluminum aspirin and 65 mg. activated charcoal were prepared according to the procedure of Example 1 from the following ingredients:

| | Grams |
|---|---|
| Aluminum aspirin | 3,250 |
| Activated charcoal | 625 |
| Starch, U.S.P. | 350 |
| Gelatin, U.S.P. | 10 |
| Talc, U.S.P. | 200 |
| Calcium stearate | 30 |

For the relief of severe pain, an initial dose of 3 tablets followed by 2 tablets every 3 hours up to 11 tablets per day is used.

EXAMPLE 7

20,000 tablets for oral use, each containing 195 mg. (approximately 3 grains) each of the 1:2 ethyl acetate adduct of aluminum aspirin and activated charcoal, were prepared according to the procedure of Example 1 using the following ingredients:

| | Grams |
|---|---|
| Ethyl acetate:aluminum aspirin adduct (1:2) | 3,900 |
| Activated charcoal | 3,900 |
| Starch, U.S.P. | 300 |
| Gelatin, U.S.P. | 14 |
| Talc, U.S.P. | 200 |
| Calcium stearate | 36 |

EXAMPLE 8

20,000 enteric coated tablets, each tablet containing 195 mg. (approximately 3 grains) each of aluminum aspirin and activated charcoal, were prepared using the quantities and procedure of Example 2, with the exception that the tablets were coated with cellulose acetate phthalate.

The tablets and capsules prepared as described in the above examples were stored under usual storage conditions for periods of 2 years. The aspirin moiety in such compositions were found to have remained stable after such storage.

In addition to possessing the analgesic and antipyretic properties of aspirin, the aluminum salt of aspirin also exerts a strong buffering effect and thereby overcomes the "burning" sensation frequently experienced when free aspirin is taken. The activated charcoal also helps this burning sensation.

We claim:

1. A stable aspirin-activated charcoal composition in oral compressed tablet, 2-piece hard gelatin capsule, or soft gelatin capsule dosage unit form consisting essentially of, in intimate admixture, at least 65 mg. each of aluminum aspirin and activated charcoal, said composition being stable for at least 2 years to hydrolysis of aluminum aspirin.

2. A composition according to claim 1 wherein the ratio by weight of the aluminum aspirin to activated charcoal is from about 9:1 to 1:9.

3. A composition according to claim 2 wherein the ratio by weight of the aluminum aspirin to activated charcoal is about 1:1.

4. A composition according to claim 2 wherein the ratio by weight of aluminum aspirin to activated charcoal is about 2:9.

5. A composition according to claim 1 wherein the aluminum aspirin is in the form of an ethyl acetate adduct having an ethyl acetate:aluminum aspirin molar ratio of about 1:2.

References Cited

UNITED STATES PATENTS

| 1,741,589 | 12/1929 | Scott et al. | 424—48 X |
| 2,086,386 | 7/1937 | Merrill | 424—230 |
| 2,465,233 | 3/1949 | King et al. | 424—48 |
| 2,698,332 | 12/1954 | Beekman | 260—448 |
| 2,918,485 | 12/1959 | Schenck et al. | 260—448 |
| 3,350,270 | 10/1967 | Gaunt | 424—230 |

SHEP K. ROSE, Primary Examiner

U.S. Cl. X.R.

424—230